Jan. 23, 1951  A. MANHARTSBERGER  2,538,787
VALVE CONTROL MEANS
Filed Dec. 29, 1945

INVENTOR
ALBERT MANHARTSBERGER
BY
J. William Carson
ATTORNEY

Patented Jan. 23, 1951

2,538,787

UNITED STATES PATENT OFFICE 2,538,787

VALVE CONTROL MEANS

Albert Manhartsberger, Bloomfield, N. J., assignor to Specialties Development Corporation, Bloomfield, N. J., a corporation of New Jersey Application December 29, 1945, Serial No. 638,133

10 Claims. (Cl. 74—501)

This invention relates to control means, and particularly to such control means embodying a sheave on which a cable is wound for operating a valve by remote control.

Accordingly, an object of the invention is to provide such valve control means embodying means to facilitate winding the cable on the sheave and adjustment between the sheave and an operating member.

Another object is to provide means of the above-indicated character in which a valve operating member is moved axially in response to rotative movement of the sheave and is held in operative position at the end of the pull of the cable on the sheave.

Another object is to provide means for indicating when the valve operating member is in operative position, and when it has been displaced by inadvertence or tampering.

A further object is to provide a valve control unit which is simple and durable in construction, economical to manufacture and effective in operation.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 1:
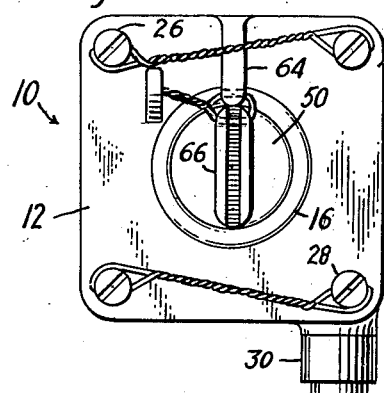
Figure 1 is an end elevational view of a device embodying the invention.

Referring to Figures 1 to 7, inclusive, the device therein shown comprises a supporting means or casing 10, generally of rectangular box-like character, including opposite end walls 12 and 14 formed with axially aligned sleeves or bearings 16 and 18, respectively, protruding outwardly of the casing. The casing is divided, laterally of its longitudinal axis on a diagonal plane, indicated by line 20 (Figures 2 and 4), into a body member 22 proper having the end wall 14 and the sleeve 18, and an end closure member 24 for the body member 22 and having the end wall 12 and the sleeve 16.

Figure 2:
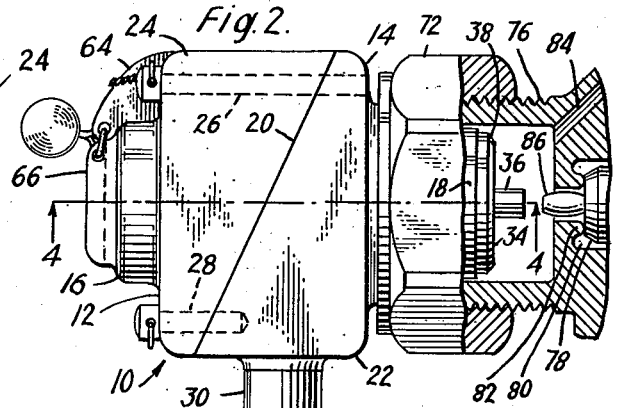
Figure 2 is a side elevational view of the device shown in Figure 1 and a portion of a valve controlled thereby illustrated in section.
Figure 3:
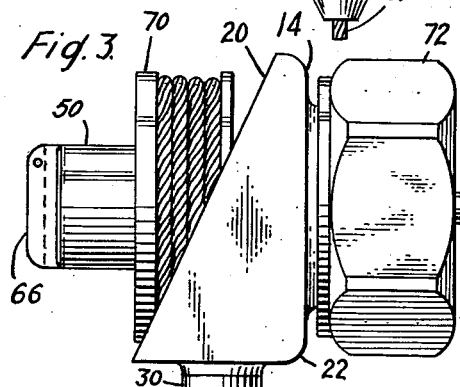
Figure 3 is a side elevational view of the device showing the closure member removed.

As better seen in Figure 2, the closure member 24, by reason of the diagonal body fitting edge thereof, is secured to the body member 22 at one side by long screws 26 and at the opposite side by short screws 28. The body member 22 has an outwardly projecting cable outlet conduit portion 30 at the side of the short screws 28. The latter, as seen in Figure 3, is opposite a side opening of the body 22, defined by the line 20 and provided upon removal of the closure member.

Figure 4:
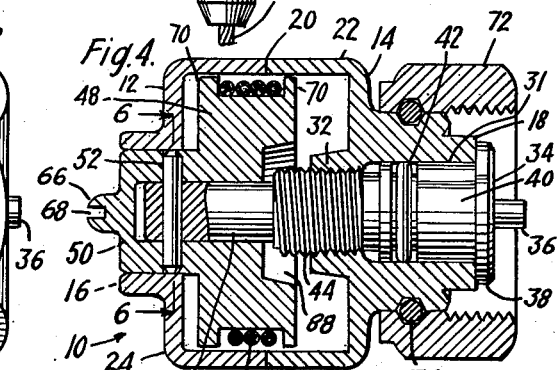
Figure 4 is a sectional view taken substantially along the line 4—4 of Figure 2.

As seen in Figure 4, the body sleeve 18 has a smooth inner bore portion 31 and a low pitch internally screw-threaded extension 32 projecting therefrom, and from the wall 14, into the casing 10.

A valve operating stem 34 has an outer end projection 36, a flange 38 normally resting against the adjacent end of the sleeve 18, a portion 40 slidably fitting the smooth bore of the sleeve 18, a groove containing a packing ring 42, an exteriorly screw-threaded portion 44 fitting the threads of the extension 32, and a length 46 on which a sheave 48 is mounted.

The sheave 48 has a cup-like outer end extension 50 journaled in the smooth bore of the sleeve 16 and covering the outer end of the stem length 46 to which it is secured, as by a pin 52. As better seen in Figure 6, the sheave 48 may be adjusted and fixed in adjusted position peripherally of the stem 34, by placing the pin 52 through any of a plurality of pairs of openings 54, the openings of each pair of which are radially opposite each other, and staking the extension 50 over the ends of the pin, as indicated.

Figure 5:
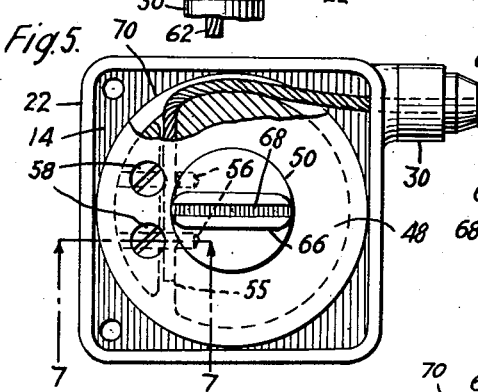
Figure 5 is an end view of the device, illustrating the closure removed and a portion of the sheave in section.
Figure 7:
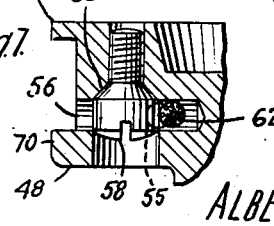
Figure 7 is an enlarged sectional fragmentary detail view taken substantially along the line 7—7 of Figure 5.

As indicated in Figures 5 and 7, the sheave 48 has a long bore 55 therethrough along a chord thereof, and a pair of short bores 56 intersecting the bore 55. Axially extending screws 58, intersecting the short bores 56, have beveled portions 60 under the heads thereof, by which, when a cable 62 is threaded through the cable outlet 30 and through the long bore 55 past the short bores 56, and the screws 58 are driven home, the beveled portions 60 kink the cable into the short bores 56 to anchor it to the sheave.

A web-like projection 64 on the closure member 24 constitutes reference means for cooperation with a radial web projection or index means 66 on the sheave extension 50.

After the above operation of threading the cable 62 and anchoring it to the sheave 48, the sheave is turned, as by the use of a screw driver in a slot 68 of the index web 66, to wind a few turns of the cable on the sheave between side angles 70 thereof. With the closure member 24 removed, as shown in Figure 3, the side of the casing opposite the cable outlet 30 is almost entirely open, and a large part of the sheave exposed whereby the operation of winding the cable on the sheave in uniform layers is greatly facilitated.

The body member sleeve 18 and a nut 72 thereon are provided with registering annular grooves for the reception of a wire 74, which locks the nut axially relative to the casing 10, but permits the nut to be turned for connection to a threaded mounting portion 76, as indicated in Figure 2, of a valve to be operated by the stem 34. The arrangement also permits the casing 10 to be adjusted to any position about its axis relative to the portion 76 without disturbing the connection.

The portion 76 is disposed about the axis of a pilot valve member 78 in a pilot valve chamber 80 having a seat 82 for the member 78, which is normally seated to close communication between the chamber 80 and a duct 84 leading to the pressure side of a piston for operating a main discharge valve (not shown).

The pilot valve member 78 has a short stem 86 aligned with the projection 36 whereby, when the latter is advanced to engage the stem 86 and unseat the pilot valve member 78, pressure fluid passes from the chamber 80 and through the duct 84 for actuating the aforesaid piston to operate its valve.

When the cable 62 is pulled, the sheave 48 is turned, which turns the stem 34 and advances the latter axially outwardly by reason of its screw threaded operation in the extension 32. In this instance, the sheave advances with the stem, and is provided with an end recess 88 which telescopes the extension 32.

In adjusting the stem 34 axially relative to the sheave 48, although the openings 54 are sixty degrees apart, since the pitch of the screw threads on the stem portion 44 is very low, the adjustment of the pin 52, from one pair of the openings 54 to the next pair effects a very fine precision adjustment of the stem.

Figure 8:
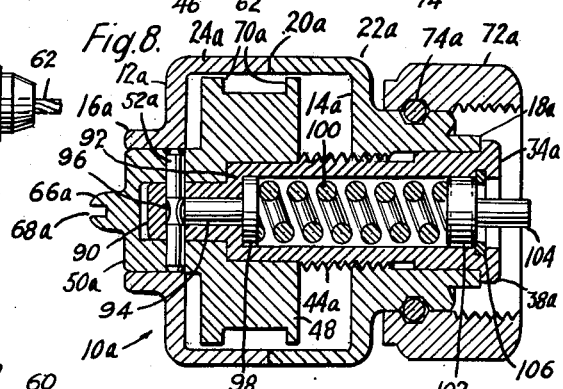
Figure 8 is a sectional view similar to Figure 4 of the modified form of the invention.
Figure 6:
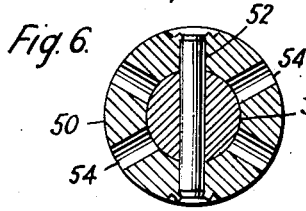
Figure 6 is an enlarged sectional detail view, taken substantially along the line 6—6 of Figure 4.

Referring to Figure 8, in which corresponding parts are designated by corresponding reference numerals, with the letter "a" suffixed, a modified embodiment is illustrated, the construction and operation of which are similar to the embodiment described in Figures 1 to 7.

A casing 10a, similarly has body and closure members 22a and 24a, respectively, diagonally divided at 20a, end walls 12a and 14a, and sleeves 16a and 18a.

A stem 34a, in Figure 8, is hollow, except for a closed end 90, and is provided with an inner shoulder 92. A plunger rod 94 has one end of which fits a recess 96 in a pin 52a, which in this case is a slip pin locked by the rod 94. The opposite end of the rod 94 has a head 98 against which one end of a spring 100 in the stem 34a presses to hold the rod in the recess 96. The other end of the spring 100 bears against a portion 102 of a valve operating element 104 protruding from the inner end of the device, which portion 102 is limited in its outward movement by a ring 106 in the stem 34a. Thus, the spring 100 serves the double function of locking the pin 52a and permitting the element 104 to recede into the stem, when the sheave is turned by a slight amount more than necessary to move the element 104 to full valve operating position.

The feature, including the slight extra turning of the sheave, is provided to absorb any shock which may occur at the end of an unnecessarily strong cable pull.

From the above description, it is apparent that novel valve control means have been provided which are simple, compact and rugged, which facilitate assembly, winding of the cable on the sheave and adjustment to a high degree, which indicate with precision the positions of the valve operating stems and whether these positions have been changed by accident or intent, and which have other advantages rendering the invention a distinct improvement in its field.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In valve control means, the combination of a sheave, a casing for said sheave divided in a plane diagonal to and across the sheave axis into body and closure members, the body member of which has a cable receiving side wall portion, and a cable wound on said sheave and extending through said cable receiving portion.

2. In a valve control means, the combination of a sheave, a casing for said sheave constructed of complementary body and closure members separable along a plane diagonal to and across the axis of said sheave, said body member having a side wall opening, a cable wound on said sheave and extending through said opening, and means for detachably securing said closure member to said body member, whereby said sheave is readily accessible when said closure member is detached.

3. In valve control means, the combination of a casing forming a chamber including opposite end body and closure members separable along a plane diagonal to and across the longitudinal axis of the casing and each having an end wall and a bearing sleeve protruding outwardly of the casing from its end wall, the body end wall sleeve being internally screw-threaded, a shaft threadedly mounted in said body sleeve carrying a valve operating element, a sheave on said shaft in said casing chamber having a portion journaled in said closure sleeve, means for peripherally adjustably securing said sheave to said shaft, and a cable wound on said sheave and extending through an opening in the casing.

4. In valve control means, the combination of a casing forming a chamber and being divided in a plane diagonal to and across the longitudinal casing axis to provide a body member and a closure member at opposite ends each having an outer casing end wall and a bearing sleeve protruding outwardly of the casing from the corresponding end wall, the sleeve of said body member end wall having internal screw threads and the closure member end wall having exterior reference means, a shaft in said body member and the sleeve thereof cooperatively screw-threaded to the latter and carrying a valve operating element at its outer end and having a sheave mounting portion at its inner end, a sheave on said mounting portion partially enclosed by said body member and partially by said closure member and having a portion journaled in said closure member sleeve provided with exterior index means for cooperation with said reference means, means providing for peripherally adjustably securing said sheave to said shaft, and a cable fixed adjacent to its inner end to said sheave wound on the sheave and extending through an opening in said body member.

5. The combination of supporting means, aligned bearings or said means, one of which is screw threaded, hollow valve control means cooperatively threaded to said threaded bearing for movement axially thereof, a valve control element in said hollow valve control means for axial movement therewith and relative thereto, means for limiting said relative movement, a sheave operatively associated with said control means and journaled by another of said bearings for rotative movement effecting said axial movement, spring means in said hollow control means for urging said control element against said limiting means, and means including a cable having a portion around said sheave for turning the sheave.

6. The combination of supporting means, aligned bearings on said means, one of which is screw-threaded, hollow valve control means cooperatively threaded to said threaded bearing for axial movement, a valve control element in said valve control means for axial movement therewith and relative thereto, limiting means for said relative movement, means including a sheave operatively associated with said control means, and journaled by another of said bearings for rotative movement effecting the axial movement of said control means, means providing for peripherally adjustably securing said sheave to said valve control means to facilitate axially adjusting said control element, means for locking said adjusting means in adjusted position, spring means in said control member for urging said control element against said limiting means and for holding said locking means in locking position, and means including a cable having a portion around said sheave for turning the sheave.

7. In valve control means, the combination of means including a plurality of aligned bearings, one of which is internally screw-threaded, a hollow shaft exteriorly threadedly journaled in said threaded bearing, means including a sheave for moving the shaft axially by turning it for screw-threaded action in said threaded bearing and having a portion journaled in another of said bearings, a valve operating element mounted for axial movement in said hollow shaft and projecting therefrom, a spring in said shaft for biasing said element axially, means for limiting the axial movement of said element by said spring, and means including a cable having a portion wound on said sheave for turning the sheave.

8. In valve control means, the combination of a casing forming a chamber and divided in a plane diagonal to and across the longitudinal casing axis into opposite end body and closure members each having an outer casing end wall and a bearing sleeve protruding outwardly of the casing from the corresponding end wall, the sleeve of said body member end wall having internal screw threads and the closure member end wall having exterior reference means, a hollow shaft in said body member and the sleeve thereof cooperatively screw-threaded to the latter and having a sheave mounting portion at its inner end, a sheave in said casing enclosed partially by said body member and partially by said closure member and having a portion journaled in said closure member sleeve provided with exterior index means for cooperation with said reference means, holding means for peripherally adjustably securing said sheave to said shaft, a valve operating element axially movably mounted in said shaft having a portion normally protruding from the outer end thereof, a spring in said shaft biasing said element outwardly, means for limiting outward movement of said element by said spring, and a cable wound on said sheave and extending through an opening in said body member.

9. In a valve control means, the combination of a casing forming a chamber including opposite end body and closure members separable along a plane diagonal to and across the longitudinal axis of the casing and each having an end wall formed with a bearing, the body end wall bearing being internally threaded, a shaft threadedly mounted in said body end wall bearing carrying a valve operating element, a sheave in said chamber on said shaft having a portion rotatably supported in said closure end wall bearing, said body member having a side wall opening, and a cable on said sheave having an end extending through said opening.

10. In valve control means, the combination of valve operating means, means for rotatably mounting said valve operating means and effecting axial movement thereof upon rotation, a sheave for rotating said valve operating means, and a cable for rotating said sheave, said valve operating means including a tubular member, a valve member unseating element mounted in said tubular member for axial movement with respect thereto and yieldable means in said tubular member for urging said element into valve member engaging position but adapted to yield whereby further rotation of said sheave and axial movement of said valve operating means is provided for after said valve member has been unseated by said element.

ALBERT MANHARTSBERGER.

REFERENCES CITED

The following references are of record in the file of this patent:

UNITED STATES PATENTS

| Number | Name | Date |
| --- | --- | --- |
| 1,683,911 | Morris | Sept. 11, 1928 |
| 1,924,404 | Houdaille | Aug. 29, 1933 |
| 2,270,117 | Fill | Jan. 13, 1942 |
| 2,291,619 | Grant | Aug. 4, 1942 |
| 2,384,742 | Hewitt | Sept. 11, 1945 |
| 2,386,210 | Grant, Jr. | Oct. 9, 1945 |